United States Patent
Kitaura et al.

(10) Patent No.: US 11,597,822 B2
(45) Date of Patent: *Mar. 7, 2023

(54) RUBBER COMPOSITION FOR TIRES AND PNEUMATIC TIRE

(71) Applicant: SUMITOMO RUBBER INDUSTRIES, LTD., Kobe (JP)

(72) Inventors: Takehiro Kitaura, Kobe (JP); Subaru Toya, Kobe (JP); Hayato Yoshiyasu, Kobe (JP); Hiroaki Yamada, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 352 days.

This patent is subject to a terminal disclaimer.

(21) Appl. No.: 16/498,258

(22) PCT Filed: Apr. 13, 2018

(86) PCT No.: PCT/JP2018/015560
§ 371 (c)(1),
(2) Date: Sep. 26, 2019

(87) PCT Pub. No.: WO2018/190427
PCT Pub. Date: Oct. 18, 2018

(65) Prior Publication Data
US 2020/0024432 A1      Jan. 23, 2020

(30) Foreign Application Priority Data
Apr. 14, 2017 (JP) .............. JP2017-080968

(51) Int. Cl.
| | | |
|---|---|---|
| *C08L 9/06* | (2006.01) | |
| *C08K 3/013* | (2018.01) | |
| *B60C 1/00* | (2006.01) | |
| *C08K 5/01* | (2006.01) | |
| *C08K 5/3477* | (2006.01) | |
| *C08L 47/00* | (2006.01) | |
| *C08L 25/04* | (2006.01) | |
| *C08K 3/04* | (2006.01) | |
| *C08K 3/36* | (2006.01) | |

(52) U.S. Cl.
CPC .............. *C08L 9/06* (2013.01); *B60C 1/0016* (2013.01); *C08K 3/013* (2018.01); *C08K 5/01* (2013.01); *C08K 5/3477* (2013.01); *C08L 25/04* (2013.01); *C08L 47/00* (2013.01); *C08K 3/04* (2013.01); *C08K 3/36* (2013.01)

(58) Field of Classification Search
CPC ........... C08K 5/3477; C08K 3/36; C08L 9/06; C08L 25/04
See application file for complete search history.

(56) References Cited

U.S. PATENT DOCUMENTS

| | | | | |
|---|---|---|---|---|
| 4,835,063 A | | 5/1989 | Jadamus et al. | |
| 5,877,249 A | * | 3/1999 | Lambotte | .................. C08L 9/00 524/493 |
| 8,653,195 B2 | * | 2/2014 | Blok | ....................... C08L 47/00 525/191 |
| 2004/0122157 A1 | * | 6/2004 | Labauze | .................... C08L 9/00 524/487 |
| 2013/0274404 A1 | * | 10/2013 | Vasseur | .................... C08K 5/31 524/526 |
| 2015/0329704 A1 | | 11/2015 | Miyazaki et al. | |
| 2018/0273723 A1 | | 9/2018 | Sato et al. | |

FOREIGN PATENT DOCUMENTS

| | | | | |
|---|---|---|---|---|
| CN | 105086027 A | | 11/2015 | |
| EP | 3176001 A1 | * | 6/2017 | .......... B60C 1/0016 |
| JP | 63-114641 A | | 5/1988 | |
| JP | 2014-173062 A | | 9/2014 | |
| JP | 2015-93928 A | | 5/2015 | |
| JP | 2015093928 A | * | 5/2015 | |
| WO | WO 2011/158509 A1 | | 12/2011 | |
| WO | WO 2014/021002 A1 | | 2/2014 | |
| WO | WO 2017/057758 A1 | | 4/2017 | |
| WO | WO 2018/164246 A1 | | 9/2018 | |
| WO | WO 2018/169064 A1 | | 9/2018 | |

OTHER PUBLICATIONS

Total (ClearTack W100, Total, 2019, 1 page).*
Google patents translation of JP 2015093928 (2015, 6 pages).*
International Search Report for PCT/JP2018/015560 dated Jul. 10, 2018.
Written Opinion of the International Searching Authority for PCT/JP2018/015560 (PCT/ISA/237) dated Jul. 10, 2018.

* cited by examiner

*Primary Examiner* — Brieann R Johnston
(74) *Attorney, Agent, or Firm* — Birch, Stewart, Kolasch & Birch, LLP

(57) ABSTRACT

The present invention provides a rubber composition for tires which provides improved abrasion resistance, and a pneumatic tire containing the rubber composition. The present invention relates to a rubber composition for tires containing a rubber component including at least 80% by mass in total of at least one of an isoprene-based rubber, a polybutadiene rubber, or a styrene-butadiene rubber, the rubber composition containing, per 100 parts by mass of the rubber component, 3 to 250 parts by mass of a reinforcing filler and 0.2 to 10 parts by mass of a specific tetrazine compound.

11 Claims, No Drawings

RUBBER COMPOSITION FOR TIRES AND PNEUMATIC TIRE

TECHNICAL FIELD

The present invention relates to a rubber composition for tires, and a pneumatic tire.

BACKGROUND ART

Recently, there has been a growing demand for tires with improved abrasion resistance. At present, however, the improvement in abrasion resistance is less than satisfactory.

Meanwhile, Patent Literature 1 discloses the incorporation of tetrazine compounds into butyl-based rubber compositions to improve flex fatigue resistance. Such tetrazine compounds are known as reagents for Diels-Alder reactions, as described in Non-Patent Literature 1. Moreover, various tetrazine compounds are known as described in Non-Patent Literatures 2 and 3.

CITATION LIST

Patent Literature

Patent Literature 1: JP 2015-93928 A

Non-Patent Literature

Non-Patent Literature 1: Tetrazine-Mediated Postpolymerization Modification, Sarthak Jain, Kevin Neumann, Yichuan Zhang, Jin Geng, and Mark Bradley Non-Patent Literature 2: http://www.sigmaaldrich.com/catalog/product/aldrich/ald00098?lang-ja®ion=JP Non-Patent Literature 3: http://www.tcichemicals.com/eshop/ja/jp/commodity/D3640/

SUMMARY OF INVENTION

Technical Problem

Patent Literature 1 does not describe the mechanism of the reactions between butyl-based rubbers and tetrazine compounds, and the mechanism of improvement in flex fatigue resistance is not clarified. The present inventors speculated that there might be some reactions between butyl-based rubbers and tetrazine compounds, and found that tetrazine compounds may be used to reinforce polymers and therefore to improve abrasion resistance of pneumatic tires. The present invention aims to provide a rubber composition for tires which uses a tetrazine compound to improve abrasion resistance, and a pneumatic tire containing the rubber composition.

Solution to Problem

As a result of extensive studies, the present inventors speculated that tetrazine compounds may react with the double bonds of polymers. It was then speculated that the butyl-based rubbers used as rubber components in the invention of Patent Literature 1 have low reactivity with tetrazine compounds because they have no double bonds except for a small amount of isoprene units therein. Thus, the inventors tried using diene rubbers as the rubber components, which was found to provide good abrasion resistance. This is probably because these rubber components, specifically the double bonds of the diene rubbers react with the tetrazine compounds such that the number of side chains of the rubber components is increased, and these side chains interact with reinforcing fillers, particularly carbon black or silica, thus improving abrasion resistance. Further, the rubber components with an increased number of side chains are also considered to have improved affinity with hydrocarbon resins. Thus, when hydrocarbon resins are combined with the tetrazine compounds, the ratio between them seems to be important, and therefore the inventors discovered the relational equation according to the present invention. With these features, it is possible to improve overall properties including not only abrasion resistance but also fuel economy and wet grip performance.

The present invention, which was completed based on the above findings, relates to a rubber composition for tires, containing a rubber component including at least 80% by mass in total of at least one of an isoprene-based rubber, a polybutadiene rubber, or a styrene-butadiene rubber, the rubber composition containing, per 100 parts by mass of the rubber component, 3 to 250 parts by mass of a reinforcing filler and 0.2 to 10 parts by mass of a tetrazine compound represented by the following formula (1):

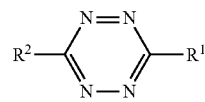

wherein $R^1$ and $R^2$ may be the same or different and each represent a hydrogen atom, $-COOR^3$ in which $R^3$ represents either a hydrogen atom or an alkyl group, or a C1-C11 monovalent hydrocarbon group optionally containing a heteroatom, and $R^1$ and $R^2$ may each form a salt, the rubber composition containing a hydrocarbon resin, the rubber composition satisfying the equation: $Y/X=3$ to 100 wherein X and Y denote amounts of the tetrazine compound and the resin, respectively, per 100 parts by mass of the rubber component.

The tetrazine compound is preferably a compound represented by the following formula (1-1), (1-2), (1-3), or (1-4):

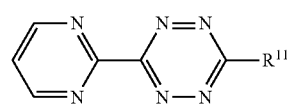

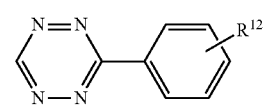

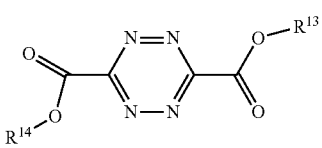

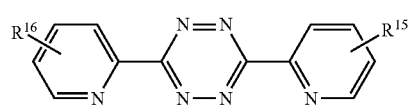

wherein in formula (1-1), $R^{11}$ represents a hydrogen atom, $-COOR^{17}$ in which $R^{17}$ represents either a hydrogen atom or an alkyl group, or a C1-C11 monovalent hydrocarbon group optionally containing a heteroatom, and $R^{11}$ may form a salt;

in formula (1-2), $R^{12}$ represents a functional group containing at least one atom selected from the group consisting of nitrogen, oxygen, sulfur, fluorine, and silicon atoms, and $R^{12}$ may form a salt;

in formula (1-3), $R^{13}$ and $R^{14}$ may be the same or different and each represent a hydrogen atom or an alkyl group, and $R^{13}$ and $R^{14}$ may each form a salt; and in formula (1-4), $R^{15}$ and $R^{16}$ may be the same or different and each represent a hydrogen atom, —COOR$^{18}$ in which $R^{18}$ represents either a hydrogen atom or an alkyl group, or a functional group containing at least one atom selected from the group consisting of nitrogen, oxygen, sulfur, fluorine, and silicon atoms, and $R^{15}$ and $R^{16}$ may each form a salt.

The tetrazine compound is preferably a compound represented by the following formula (1-1-1), (1-1-2), (1-2-1), (1-3-1), (1-4-1), or (1-4-2):

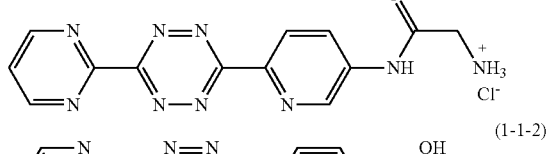
(1-1-1)

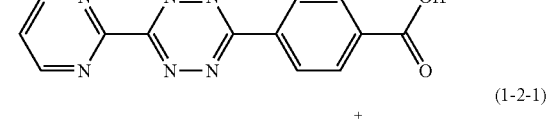
(1-1-2)

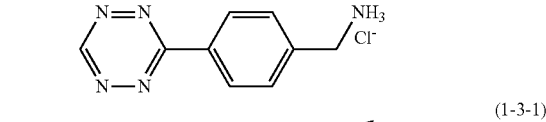
(1-2-1)

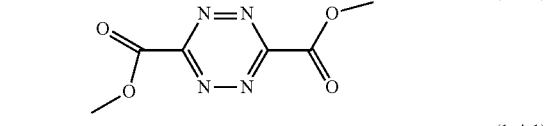
(1-3-1)

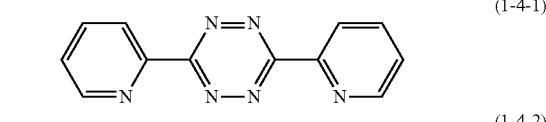
(1-4-1)

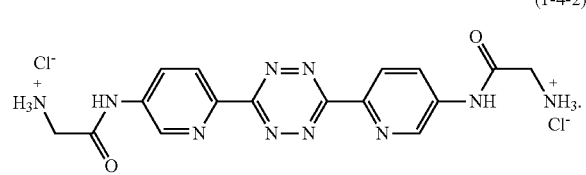
(1-4-2)

The resin preferably has a number of hydrogen atoms with H$^1$-NMR chemical shifts in the range of at least 4 ppm but not more than 6 ppm of 5% or less of the total number of hydrogen atoms.

The present invention also relates to a rubber composition for tires, containing a rubber component including at least 80% by mass in total of at least one of an isoprene-based rubber, a polybutadiene rubber, or a styrene-butadiene rubber, the rubber composition containing, per 100 parts by mass of the rubber component, 3 to 50 parts by mass of carbon black and 0.2 to 10 parts by mass of a tetrazine compound represented by the following formula (1-1), (1-2), (1-3), or (1-4):

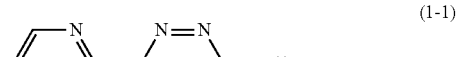
(1-1)

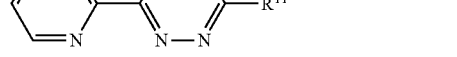
(1-2)

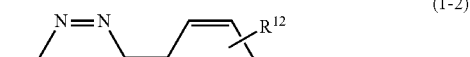
(1-3)

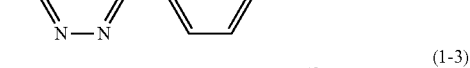
(1-4)

wherein in formula (1-1), $R^{11}$ represents a hydrogen atom, —COOR$^{17}$ in which $R^{17}$ represents either a hydrogen atom or an alkyl group, or a C1-C11 monovalent hydrocarbon group optionally containing a heteroatom, and $R^{11}$ may form a salt;

in formula (1-2), $R^{12}$ represents a functional group containing at least one atom selected from the group consisting of nitrogen, oxygen, sulfur, fluorine, and silicon atoms, and $R^{12}$ may form a salt;

in formula (1-3), $R^{13}$ and $R^{14}$ may be the same or different and each represent a hydrogen atom or an alkyl group, and $R^{13}$ and $R^{14}$ may each form a salt; and in formula (1-4), $R^{15}$ and $R^{16}$ may be the same or different and each represent a hydrogen atom, —COOR$^{18}$ in which $R^{18}$ represents either a hydrogen atom or an alkyl group, or a functional group containing at least one atom selected from the group consisting of nitrogen, oxygen, sulfur, fluorine, and silicon atoms, and $R^{15}$ and $R^{16}$ may each form a salt.

The present invention also relates to a pneumatic tire, including a tread containing the rubber composition.

Advantageous Effects of Invention

The rubber composition for tires according to the first aspect of the present invention contains a rubber component including at least 80% by mass in total of at least one of an isoprene-based rubber, a polybutadiene rubber, or a styrene-butadiene rubber. Further, the rubber composition contains, per 100 parts by mass of the rubber component, 3 to 250 parts by mass of a reinforcing filler, 0.2 to 10 parts by mass of a tetrazine compound of formula (1), and a hydrocarbon resin. Further, the rubber composition satisfies the equation: Y/X=3 to 100 wherein X and Y denote the amounts of the tetrazine compound and the resin, respectively, per 100 parts by mass of the rubber component. Thus, the rubber composition provides improved abrasion resistance.

The rubber composition for tires according to the second aspect of the present invention contains a rubber component including at least 80% by mass in total of at least one of an isoprene-based rubber, a polybutadiene rubber, or a styrene-butadiene rubber. Further, the rubber composition contains, per 100 parts by mass of the rubber component, 3 to 50 parts by mass of carbon black and 0.2 to 10 parts by mass of a tetrazine compound of formula (1-1), (1-2), (1-3), or (1-4). Thus, the rubber composition provides improved abrasion resistance.

DESCRIPTION OF EMBODIMENTS

The rubber composition for tires of the present invention contains a rubber component including at least 80% by mass in total of at least one of an isoprene-based rubber, a polybutadiene rubber, or a styrene-butadiene rubber. Further, the rubber composition contains, per 100 parts by mass of the rubber component, 0.2 to 10 parts by mass of a specific tetrazine compound together with a reinforcing filler.

The present invention improves abrasion resistance. The mechanism of this effect may be explained as follows.

When a rubber component including at least 80% by mass in total of at least one diene rubber is combined with a reinforcing filler as well as a predetermined amount of a tetrazine compound, the tetrazine compound and the at least one diene rubber are reacted sufficiently; in other words, the number of side chains of the rubber component is increased sufficiently, as a result of which the reinforcing filler produces its reinforcing effect, thereby improving abrasion resistance. Thus, the present invention synergistically improves abrasion resistance by interaction of the diene rubber, tetrazine compound, and reinforcing filler (particularly carbon black or silica).

The rubber component in the present invention includes any one or combination of diene rubbers as long as it includes at least 80% by mass in total of at least one of an isoprene-based rubber, a polybutadiene rubber (BR), or a styrene-butadiene rubber (SBR).

Examples of the isoprene-based rubber include natural rubber (NR), polyisoprene rubber (IR), refined NR, modified NR, and modified IR. The NR may be one commonly used in the tire industry such as SIR20, RSS #3, or TSR20. Any IR may be used, and examples include those commonly used in the tire industry, such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These may be used alone, or two or more of these may be used in combination.

Any BR may be used. Examples include BR having high cis content, such as BR1220 available from Zeon Corporation and BR130B and BR150B both available from Ube Industries, Ltd.; BR containing syndiotactic polybutadiene crystals, such as VCR412 and VCR617 both available from Ube Industries, Ltd.; and BR synthesized using rare earth catalysts (rare earth-catalyzed BR). These may be used alone, or two or more of these may be used in combination. In particular, the BR preferably has a cis content of 95% by mass or more to improve abrasion resistance.

The BR may be a commercial product of, for example, Ube Industries, Ltd., JSR Corporation, Asahi Kasei Corporation, or Zeon Corporation.

The BR may be an unmodified or modified BR.

The modified BR may be any BR having a functional group interactive with a filler such as silica. For example, it may be a chain end-modified BR obtained by modifying at least one chain end of BR with a compound (modifier) having the functional group (a chain end-modified BR terminated with the functional group); a backbone-modified BR having the functional group in the backbone; a backbone- and chain end-modified BR having the functional group in both the backbone and chain end (e.g., a backbone- and chain end-modified BR in which the backbone has the functional group and at least one chain end is modified with the modifier); or a chain end-modified BR that has been modified (coupled) with a polyfunctional compound having two or more epoxy groups in the molecule so that a hydroxyl or epoxy group is introduced.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, and epoxy groups. These functional groups may be substituted. To more suitably achieve the effects of the present invention, amino (preferably amino whose hydrogen atom is replaced with a C1-C6 alkyl group), alkoxy (preferably C1-C6 alkoxy), and alkoxysilyl (preferably C1-C6 alkoxysilyl) groups are preferred among these.

Any SBR may be used. Examples include emulsion-polymerized styrene-butadiene rubber (E-SBR) and solution-polymerized styrene-butadiene rubber (S-SBR). These may be used alone, or two or more of these may be used in combination.

The bound styrene content of the SBR is preferably 5% by mass or higher, more preferably 20% by mass or higher, still more preferably 25% by mass or higher. When the bound styrene content is not lower than the lower limit, excellent wet grip performance tends to be sufficiently obtained. The bound styrene content is also preferably 60% by mass or lower, more preferably 40% by mass or lower. When the bound styrene content is not higher than the upper limit, excellent abrasion resistance and fuel economy tend to be obtained.

Herein, the bound styrene content of the SBR is determined by $H^1$-NMR.

The SBR may be a commercial product manufactured or sold by, for example, Sumitomo Chemical Co., Ltd., JSR Corporation, Asahi Kasei Corporation, or Zeon Corporation.

The SBR may be an unmodified or modified SBR. Examples of the modified SBR include those in which functional groups as mentioned for the modified BR are introduced.

Examples of rubbers other than the isoprene-based rubber, BR, and SBR which may be used in the rubber component include diene rubbers such as styrene-isoprene-butadiene rubber (SIBR), ethylene-propylene-diene rubber (EPDM), chloroprene rubber (CR), and acrylonitrile butadiene rubber (NBR), and butyl-based rubbers. These may be used alone, or two or more of these may be used in combination.

The combined amount of the isoprene-based rubber, BR, and SBR based on 100% by mass of the rubber component is 80% by mass or more, preferably 90% by mass or more, and may be 100% by mass.

The amount of the BR, if present, based on 100% by mass of the rubber component is preferably 5% by mass or more, more preferably 10% by mass or more, but is preferably 40% by mass or less, more preferably 30% by mass or less. When the amount is adjusted within the range indicated above, the effects of the present invention tend to be well achieved.

The amount of the SBR, if present, based on 100% by mass of the rubber component is preferably 50% by mass or more, more preferably 70% by mass or more, but is preferably 95% by mass or less, more preferably 90% by mass or less. When the amount is adjusted within the range indicated above, the effects of the present invention tend to be well achieved.

The rubber composition of the present invention contains a tetrazine compound represented by the following formula (1):

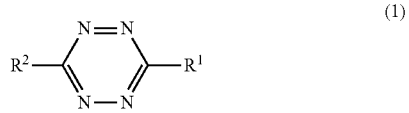

(1)

wherein $R^1$ and $R^2$ may be the same or different and each represent a hydrogen atom (—H), —COOR$^3$ in which $R^3$ represents either a hydrogen atom (—H) or an alkyl group, or a C1-C11 monovalent hydrocarbon group optionally containing a heteroatom, and $R^1$ and $R^2$ may each form a salt.

Examples of the heteroatom include nitrogen, oxygen, and sulfur atoms.

The hydrocarbon group as $R^1$ or $R^2$ has 1 to 11 carbon atoms, preferably 2 to 9 carbon atoms, more preferably 4 to 7 carbon atoms.

$R^1$ and $R^2$ are each preferably —COOR$^3$ or a heteroatom-containing hydrocarbon group because such a tetrazine compound is expected to interact easily with a reinforcing filler, particularly carbon black or silica, thereby resulting in better abrasion resistance. More preferably, both $R^1$ and $R^2$ are heteroatom-containing hydrocarbon groups.

The hydrocarbon group as $R^1$ or $R^2$ is not particularly limited, but is preferably a homocyclic or heterocyclic group because such a tetrazine compound is expected to interact easily with a reinforcing filler, particularly carbon black or silica, thereby resulting in better abrasion resistance. More preferably, at least one of $R^1$ and $R^2$ is a heterocyclic group. Still more preferably, both $R^1$ and $R^2$ are heterocyclic groups.

Herein, the term "homocyclic group" refers to a group having a ring structure consisting only of carbon atoms, and the term "heterocyclic group" refers to a group having a ring structure consisting of two or more types of elements including a carbon atom.

Examples of the homocyclic group include aryl and cycloalkyl groups. Among these, aryl groups are preferred.

Examples of aryl groups include phenyl and naphthyl groups. Among these, a phenyl group is preferred.

Examples of cycloalkyl groups include cyclopentyl and cyclohexyl groups.

The heterocyclic group is preferably a nitrogen-containing heterocyclic group which contains a nitrogen atom as a ring-forming heteroatom, more preferably a nitrogen-containing heterocyclic group which contains only a nitrogen atom as a ring-forming heteroatom.

Examples of the nitrogen-containing heterocyclic group include aziridinyl, azetidinyl, pyrrolidinyl, piperidinyl, hexamethyleneimino, imidazolidyl, piperazinyl, pyrazolidyl, pyrrolyl, imidazolyl, pyrazolyl, pyridyl, pyridazyl, pyrimidyl, pyrazyl, quinolyl, isoquinolyl, cinnolinyl, quinazolinyl, and phthalazinyl groups. Among these, pyridyl and pyrimidyl groups are preferred, with a pyridyl group being more preferred.

The hydrogen atom in the homocyclic or heterocyclic group may be replaced by a substituent. Preferably, it is replaced by a substituent because such a tetrazine compound is expected to interact easily with a reinforcing filler, particularly carbon black or silica, thereby resulting in better abrasion resistance.

Examples of the substituent include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxyl, oxy, epoxy, sulfonate, and trifluoromethyl groups. These substituents may be further substituted by the above-listed substituents or groups other than the above-listed substituents, such as alkylene or alkyl groups. To more suitably achieve the effects of the present invention, the substituent is preferably a carboxyl group, the above-defined —COOR$^3$, an amino group (preferably a group represented by the formula (A) or (B) below), an alkoxy group (preferably a C1-C6 alkoxy group), or an alkoxysilyl group (preferably a C1-C6 alkoxysilyl group), among others.

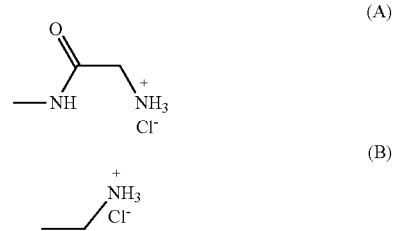

The substituent may form a salt, as in the group of formula (A) or (B). Examples of salts that may be formed include salts formed between an amino group and a halogen atom, salts formed between a carboxyl group and a monovalent metal such as Na or K, and salts formed between a sulfonate group and the monovalent metal.

$R^3$ in the group —COOR$^3$ represents a hydrogen atom or an alkyl group. The alkyl group preferably has 1 to 8 carbon atoms, more preferably 1 to 3 carbon atoms.

Examples of the alkyl group include methyl, ethyl, n-propyl, isopropyl, n-butyl, sec-butyl, and tert-butyl groups.

$R^3$ is preferably an alkyl group.

The tetrazine compound of formula (1) may be any tetrazine compound that can react with a diene rubber. The tetrazine compound may be a single compound or a combination of two or more compounds. To more suitably achieve the effects of the present invention, the tetrazine compound is preferably a compound represented by the formula (1-1), (1-2), (1-3), or (1-4) below (particularly formula (1-1) or (1-4)), more preferably a compound represented by the formula (1-1-1), (1-1-2), (1-2-1), (1-3-1), (1-4-1), or (1-4-2) below (particularly formula (1-1-1) or (1-4-1)), among others.

The tetrazine compound of formula (1) may be a commercial product or may be synthesized by known methods.

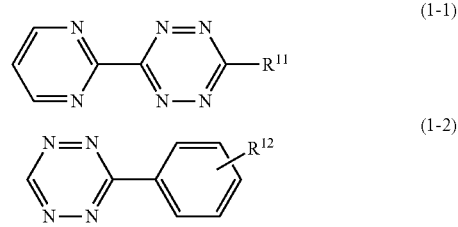

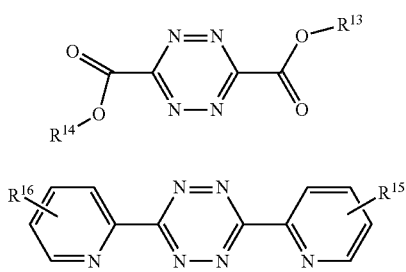

(1-3)

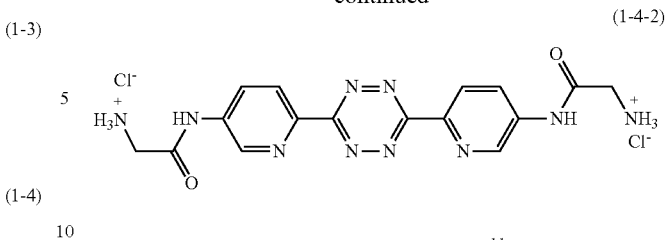

(1-4-2)

(1-4)

In formula (1-1), $R^{11}$ represents a hydrogen atom (—H), —COOR$^{17}$ in which $R^{17}$ represents either a hydrogen atom (—H) or an alkyl group, or a C1-C11 monovalent hydrocarbon group optionally containing a heteroatom, and $R^{11}$ may form a salt.

In formula (1-2), $R^{12}$ represents a functional group containing at least one atom selected from the group consisting of nitrogen, oxygen, sulfur, fluorine, and silicon atoms, and $R^{12}$ may form a salt.

In formula (1-3), $R^{13}$ and $R^{14}$ may be the same or different and each represent a hydrogen atom (—H) or an alkyl group, and $R^{13}$ and $R^{14}$ may each form a salt.

In formula (1-4), $R^{15}$ and $R^{16}$ may be the same or different and each represent a hydrogen atom (—H), —COOR$^{18}$ in which $R^{18}$ represents either a hydrogen atom (—H) or an alkyl group, or a functional group containing at least one atom selected from the group consisting of nitrogen, oxygen, sulfur, fluorine, and silicon atoms, and $R^{15}$ and $R^{16}$ may each form a salt.

Examples of the heteroatom in $R^{11}$ include those described for the heteroatom in $R^1$ or $R^2$.

The carbon number of the hydrocarbon group as $R^{11}$ is as described for the hydrocarbon group as $R^1$ or $R^2$, and suitable embodiments thereof are also the same as above.

$R^{11}$ is preferably —COOR$^{17}$ or a heteroatom-containing hydrocarbon group because such a tetrazine compound is expected to interact easily with a reinforcing filler, particularly carbon black or silica, thereby resulting in better abrasion resistance.

Examples of the hydrocarbon group as $R^{11}$ include those described for the hydrocarbon group as $R^1$ or $R^2$, and suitable embodiments thereof are also the same as above.

$R^{17}$ in the group —COOR$^{17}$ represents a hydrogen atom or an alkyl group. Examples of the alkyl group include those described for the alkyl group as $R^3$, and suitable embodiments thereof are also the same as above.

$R^{17}$ is preferably an alkyl group.

Examples of the functional group containing at least one atom selected from the group consisting of nitrogen, oxygen, sulfur, fluorine, and silicon atoms as $R^{12}$ include those described for the substituent, and suitable embodiments thereof are also the same as above.

$R^{12}$ may be at any of the ortho, meta, and para positions. To more suitably achieve the effects of the present invention, $R^{12}$ is preferably at the para position.

Examples of the alkyl group as $R^{13}$ or $R^{14}$ include those described for the alkyl group as $R^3$, and suitable embodiments thereof are also the same as above. $R^{13}$ and $R^{14}$ are each preferably an alkyl group.

To obtain better abrasion resistance, $R^{15}$ and $R^{16}$ are each preferably a hydrogen atom or a functional group containing at least one atom selected from the group consisting of nitrogen, oxygen, sulfur, fluorine, and silicon atoms.

$R^{18}$ in —COOR$^{18}$ represents a hydrogen atom or an alkyl group. Examples of the alkyl group include those described for the alkyl group as $R^3$, and suitable embodiments thereof are also the same as above.

$R^{18}$ is preferably an alkyl group.

Examples of the functional group containing at least one atom selected from the group consisting of nitrogen, oxygen, sulfur, fluorine, and silicon atoms as $R^{13}$ or $R^{16}$ include those described for the substituent, and suitable embodiments thereof are also the same as above.

$R^{13}$ and $R^{16}$ may each be at any of the ortho, meta, and para positions. To more suitably achieve the effects of the present invention, $R^{13}$ and $R^{16}$ are each preferably at the para position, and more preferably both at the para position.

The amount of the tetrazine compound per 100 parts by mass of the rubber component is 0.2 parts by mass or more, preferably 1.0 part by mass or more, more preferably 1.5 parts by mass or more. When the amount is not less than the lower limit, the effects of the present invention tend to be well achieved. Moreover, the amount is 10 parts by mass or less, preferably 5.0 parts by mass or less, more preferably

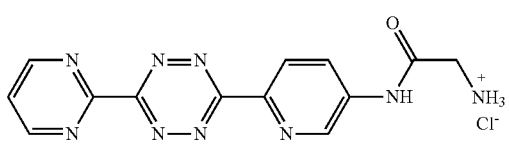

(1-1-1)

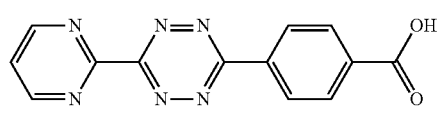

(1-1-2)

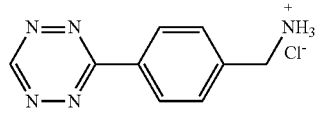

(1-2-1)

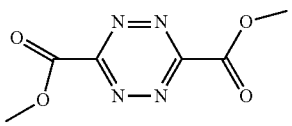

(1-3-1)

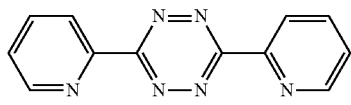

(1-4-1)

3.0 parts by mass or less. When the amount is not more than the upper limit, the effects of the present invention tend to be well achieved.

Herein, the amount of the tetrazine compound of formula (1) may refer to the combined amount of two or more tetrazine compounds, if present.

The rubber composition of the present invention contains a reinforcing filler.

Any reinforcing filler may be used, and examples include carbon black, silica, calcium carbonate, talc, alumina, clay, aluminum hydroxide, aluminum oxide, and mica. To more suitably achieve the effects of the present invention, carbon black and silica are preferred among these, with silica being more preferred.

The amount of the reinforcing filler per 100 parts by mass of the rubber component is 3 parts by mass or more, preferably 5 parts by mass or more, more preferably 20 parts by mass or more, still more preferably 40 parts by mass or more, particularly preferably 60 parts by mass or more. When the amount is not less than the lower limit, sufficient reinforcement tends to be provided, and good abrasion resistance and wet grip performance tend to be obtained. Moreover, the amount is 250 parts by mass or less, preferably 120 parts by mass or less, more preferably 100 parts by mass or less. When the amount is not more than the upper limit, good fuel economy tends to be obtained.

Any carbon black may be used. Examples include N134, N110, N220, N234, N219, N339, N330, N326, N351, N550, and N762. These may be used alone, or two or more of these may be used in combination.

The carbon black preferably has a nitrogen adsorption specific surface area ($N_2SA$) of 5 $m^2/g$ or more, more preferably 50 $m^2/g$ or more, still more preferably 100 $m^2/g$ or more. When the $N_2SA$ is not less than the lower limit, good abrasion resistance and wet grip performance tend to be obtained. The $N_2SA$ is also preferably 300 $m^2/g$ or less, more preferably 150 $m^2/g$ or less, still more preferably 130 $m^2/g$ or less. With a $N_2SA$ of not more than the upper limit, the carbon black tends to disperse better, thereby resulting in good abrasion resistance, wet grip performance, and fuel economy.

The nitrogen adsorption specific surface area of the carbon black is determined in accordance with JIS K6217-2: 2001.

The carbon black may be a commercial product of, for example, Asahi Carbon Co., Ltd., Cabot Japan K.K., Tokai Carbon Co., Ltd., Mitsubishi Chemical Corporation, Lion Corporation, NSCC Carbon Co., Ltd., or Columbia Carbon.

The amount of the carbon black, if present, per 100 parts by mass of the rubber component is preferably 3 parts by mass or more, more preferably 5 parts by mass or more. When the amount is not less than the lower limit, sufficient reinforcement tends to be provided, and good abrasion resistance and wet grip performance tend to be obtained. The amount is also preferably 50 parts by mass or less, more preferably 30 parts by mass or less, still more preferably 20 parts by mass or less. When the amount is not more than the upper limit, good fuel economy tends to be obtained.

Examples of the silica include dry silica (anhydrous silica) and wet silica (hydrous silica). Wet silica is preferred because it contains a large number of silanol groups.

The silica preferably has a nitrogen adsorption specific surface area ($N_2SA$) of 90 $m^2/g$ or more, more preferably 120 $m^2/g$ or more, still more preferably 150 $m^2/g$ or more. When the $N_2SA$ is not less than the lower limit, good abrasion resistance and wet grip performance can be obtained. The $N_2SA$ is preferably 400 $m^2/g$ or less, more preferably 200 $m^2/g$ or less, still more preferably 180 $m^2/g$ or less. When the $N_2SA$ is not more than the upper limit, good fuel economy can be obtained.

The nitrogen adsorption specific surface area of the silica is determined by the BET method in accordance with ASTM D3037-81.

The silica may be a commercial product of, for example, Degussa, Rhodia, Tosoh Silica Corporation, Solvay Japan, or Tokuyama Corporation.

The amount of the silica, if present, per 100 parts by mass of the rubber component is preferably 5 parts by mass or more, more preferably 30 parts by mass or more, still more preferably 60 parts by mass or more. When the amount is not less than the lower limit, sufficient reinforcement tends to be provided, and good abrasion resistance and wet grip performance tend to be obtained. The amount is also preferably 200 parts by mass or less, more preferably 100 parts by mass or less. When the amount is not more than the upper limit, the silica is more likely to disperse uniformly in the rubber composition, thereby resulting in good fuel economy and wet grip performance.

To better achieve the effects of the present invention, the combined amount of the carbon black and silica per 100 parts by mass of the rubber component is preferably 20 to 250 parts by mass, more preferably 40 to 120 parts by mass, still more preferably 60 to 100 parts by mass.

The rubber composition of the present invention preferably contains a silane coupling agent together with silica.

Any silane coupling agent may be used. Examples include sulfide silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(2-trimethoxysilylbutyl)tetrasulfide, bis(2-triethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone, or two or more of these may be used in combination. Among these, sulfide or mercapto silane coupling agents are preferred in order to better achieve the effects of the present invention.

The silane coupling agent is preferably a silane coupling agent represented by the formula (2) below. In this case, excellent abrasion resistance, fuel economy, and wet grip performance tend to be obtained.

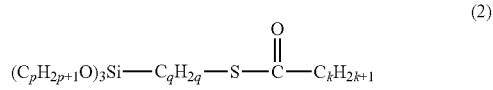

(2)

In formula (2), p represents an integer of 1 to 3, q represents an integer of 1 to 5, and k represents an integer of 5 to 12.

In formula (2), p is an integer of 1 to 3, preferably 2. When p is 3 or less, the coupling reaction tends to proceed rapidly.

q is an integer of 1 to 5, preferably 2 to 4, more preferably 3. When q is 1 to 5, the synthesis tends to be facilitated.

k is an integer of 5 to 12, preferably 5 to 10, more preferably 6 to 8, still more preferably 7.

Examples of the silane coupling agent of formula (2) include 3-octanoylthio-1-propyltriethoxysilane.

The silane coupling agent may be a commercial product of, for example, Degussa, Momentive, Shin-Etsu Silicone, Tokyo Chemical Industry Co., Ltd., AZmax. Co., or Dow Corning Toray Co., Ltd.

The amount of the silane coupling agent, if present, per 100 parts by mass of the silica is preferably 3 parts by mass or more, more preferably 5 parts by mass or more. When the amount is 3 parts by mass or more, the incorporated silane coupling agent tends to produce its effect. The amount is also preferably 20 parts by mass or less, more preferably 10 parts by mass or less. When the amount is 20 parts by mass or less, an effect commensurate with the amount tends to be provided, and good processability during kneading tends to be obtained.

A preferred embodiment of the present invention contains a hydrocarbon resin.

Herein, the term "hydrocarbon resin" refers to a polymer produced from a hydrocarbon monomer as a structural monomer, such as a polymer produced by polymerizing a hydrocarbon monomer as a main component (at least 50% by mass). The term "hydrocarbon monomer" refers to a monomer containing a hydrocarbon.

Any hydrocarbon resin commonly used in the tire industry may be used. Examples include coumarone resins, styrene resins, terpene resins, dicyclopentadiene resins (DCPD resins), C5 petroleum resins, C9 petroleum resins, C5C9 petroleum resins, p-t-butylphenol acetylene resins, and acrylic resins. These may be used alone, or two or more of these may be used in combination. In particular, the hydrocarbon resin preferably has a small number of unsaturated bonds in the structure other than a benzene ring in order to reduce the reactivity between the hydrocarbon resin and the tetrazine compound, thereby achieving a balanced improvement in fuel economy, wet grip performance, and abrasion resistance. Such a resin can be identified by $H^1$-NMR analysis. With $H^1$-NMR analysis, it is difficult to precisely quantify the number of unsaturated bonds other than those in a benzene ring. However, a resin in which the number of hydrogen atoms with chemical shifts in the range of at least 4 ppm but not more than 6 ppm is 5% or less, preferably 3% or less, of the total number of hydrogen atoms is considered as having a small number of unsaturated bonds.

Examples of the hydrocarbon resin having a small number of unsaturated bonds in the structure other than a benzene ring include terpene resins, hydrogenated terpene resins, hydrogenated dicyclopentadiene resins (hydrogenated DCPD resins), hydrogenated 05 petroleum resins, C9 petroleum resins, C5C9 petroleum resins, coumarone resins, and styrene resins. Preferred among these are resins in which the number of hydrogen atoms with $H^1$-NMR chemical shifts in the range of at least 4 ppm but not more than 9 ppm is 15% or less of the total number of hydrogen atoms. Examples of such resins include terpene resins, hydrogenated terpene resins, hydrogenated DCPD resins, and styrene resins.

Any terpene resin having units derived from a terpene compound may be used. Examples include polyterpenes (resins produced by polymerization of terpene compounds), terpene aromatic resins (resins produced by copolymerization of terpene compounds with aromatic compounds), and aromatic-modified terpene resins (resins obtained by modification of terpene resins with aromatic compounds).

The term "terpene compound" refers to a hydrocarbon having a composition represented by $(C_5H_8)_n$ or an oxygen-containing derivative thereof, each of which has a terpene backbone and is classified as, for example, a monoterpene $(C_{10}H_{16})$, sesquiterpene $(C_{15}H_{24})$, or diterpene $(C_{20}H_{32})$. Examples of the terpene compound include α-pinene, β-pinene, dipentene, limonene, myrcene, alloocimene, ocimene, α-phellandrene, α-terpinene, γ-terpinene, terpinolene, 1,8-cineole, 1,4-cineole, α-terpineol, β-terpineol, and γ-terpineol. Other examples of the terpene compound include resin acids (rosin acids) such as abietic acid, neoabietic acid, palustric acid, levopimaric acid, pimaric acid, and isopimaric acid. In other words, the terpene resins include rosin resins mainly containing rosin acids produced by processing pine resin. Examples of the rosin resins include natural rosin resins (polymerized rosins) such as gum rosins, wood rosins, and tall oil rosins, as well as modified rosin resins such as maleic acid-modified rosin resins and rosin-modified phenol resins, rosin esters such as rosin glycerol esters, and disproportionated rosin resins obtained by disproportionation of rosin resins.

The aromatic compounds may be any compound having an aromatic ring, and examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; and styrene and styrene derivatives such as alkylstyrenes, alkoxystyrenes, and unsaturated hydrocarbon group-containing styrenes. Styrene is preferred among these.

The term "styrene resin" refers to a polymer produced from a styrenic monomer as a structural monomer, such as a polymer produced by polymerizing a styrenic monomer as a main component (at least 50% by mass). Specific examples include homopolymers produced by polymerization of styrenic monomers (e.g. styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene) alone, copolymers produced by copolymerization of two or more styrenic monomers, and copolymers of styrenic monomers and additional monomers copolymerizable therewith.

Examples of the additional monomers include acrylonitriles such as acrylonitrile and methacrylonitrile, unsaturated carboxylic acids such as acrylic acid and methacrylic acid, unsaturated carboxylic acid esters such as methyl acrylate and methyl methacrylate, dienes such as chloroprene, butadiene, and isoprene, olefins such as 1-butene and 1-pentene, and α,β-unsaturated carboxylic acids and acid anhydrides thereof such as maleic anhydride.

Among such styrene resins, α-methylstyrene resins (e.g. α-methylstyrene homopolymers, copolymers of α-methylstyrene and styrene) are preferred from the standpoint of the balance of the properties.

The hydrocarbon resin preferably has a softening point of 30° C. or higher, more preferably 60° C. or higher, still more preferably 80° C. or higher, particularly preferably 100° C. or higher. When the softening point is 30° C. or higher, good abrasion resistance and wet grip performance tend to be obtained. The softening point is also preferably 160° C. or lower, more preferably 140° C. or lower. With a softening point of 160° C. or lower, the hydrocarbon resin tends to disperse well, thereby resulting in good abrasion resistance, wet grip performance, and fuel economy.

In the present invention, the softening point of the resin is determined in accordance with JIS K 6220-1:2001 using a ring and ball softening point measuring apparatus and defined as the temperature at which the ball drops down.

The hydrocarbon resin may be a commercial product of, for example, Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JX Energy Corporation, Arakawa Chemical Industries, Ltd., or Taoka Chemical Co., Ltd.

The amount of the hydrocarbon resin, if present, per 100 parts by mass of the rubber component is preferably 3 parts by mass or more, more preferably 5 parts by mass or more. When the amount is 3 parts by mass or more, good wet grip performance and abrasion resistance tend to be obtained. The amount is also preferably 150 parts by mass or less, more preferably 80 parts by mass or less, still more preferably 50 parts by mass or less. When the amount is 150 parts by mass or less, good abrasion resistance and fuel economy tend to be obtained.

The rubber composition preferably satisfies the equation: Y/X=3 to 100, more preferably 5 to 60, still more preferably 10 to 30, wherein X denotes the amount of the tetrazine compound per 100 parts by mass of the rubber component, and Y denotes the amount of the hydrocarbon resin, preferably the hydrocarbon resin having unsaturated bonds other than those in a benzene ring, per 100 parts by mass of the rubber component. When the Y/X ratio is within the range indicated above, a good balance of abrasion resistance, wet grip performance, and fuel economy tends to be obtained.

The rubber composition of the present invention may contain an oil.

Examples of the oil include process oils and plant oils, and mixtures thereof. Examples of the process oils include paraffinic process oils, aromatic process oils, and naphthenic process oils. Examples of the plant oils include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, camellia oil, jojoba oil, macadamia nut oil, and tung oil. These may be used alone, or two or more of these may be used in combination.

The oil may be a commercial product of, for example, Idemitsu Kosan Co., Ltd., Sankyo Yuka Kogyo K.K., Japan Energy Corporation, Olisoy, H&R, Hokoku Corporation, Showa Shell Sekiyu K.K., or Fuji Kosan Co., Ltd.

The amount of the oil, if present, per 100 parts by mass of the rubber component is preferably 1 part by mass or more, more preferably 10 parts by mass or more, still more preferably 30 parts by mass or more, but is preferably 80 parts by mass or less, more preferably 60 parts by mass or less. The amount of the oil here includes the amount of the oil contained in rubber (oil-extended rubber).

The rubber composition of the present invention preferably contains a wax.

Any wax may be used. Examples include petroleum waxes such as paraffin waxes and microcrystalline waxes; naturally-occurring waxes such as plant waxes and animal waxes; and synthetic waxes such as polymers of ethylene, propylene, or other similar monomers. These may be used alone, or two or more of these may be used in combination.

The wax may be a commercial product of, for example, Ouchi Shinko Chemical Industrial Co., Ltd., Nippon Seiro Co., Ltd., or Seiko Chemical Co., Ltd.

The amount of the wax, if present, per 100 parts by mass of the rubber component is preferably 0.5 parts by mass or more, more preferably 1 part by mass or more, but is preferably 10 parts by mass or less, more preferably 7 parts by mass or less.

The rubber composition of the present invention preferably contains an antioxidant.

Examples of the antioxidant include: naphthylamine antioxidants such as phenyl-α-naphthylamine; diphenylamine antioxidants such as octylated diphenylamine and 4,4'-bis (α,α'-dimethylbenzyl)diphenylamine; p-phenylenediamine antioxidants such as N-isopropyl-N'-phenyl-p-phenylenediamine, N-(1,3-dimethylbutyl)-N'-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis [methylene-3-(3',5'-di-t-butyl-4'-hydroxyphenyl)-propionate]methane. These may be used alone, or two or more of these may be used in combination. Among these, p-phenylenediamine and/or quinoline antioxidants are preferred, with N-(1,3-dimethylbutyl)-N'-phenyl-p-phenylenediamine and/or 2,2,4-trimethyl-1,2-dihydroquinoline polymer being more preferred.

The antioxidant may be a commercial product of, for example, Seiko Chemical Co., Ltd., Sumitomo Chemical Co., Ltd., Ouchi Shinko Chemical Industrial Co., Ltd., or Flexsys.

The amount of the antioxidant, if present, per 100 parts by mass of the rubber component is preferably 1 part by mass or more, more preferably 3 parts by mass or more, but is preferably 10 parts by mass or less, more preferably 7 parts by mass or less.

The rubber composition of the present invention preferably contains stearic acid.

Conventional stearic acid may be used. Examples include commercial products of NOF Corporation, Kao Corporation, FUJIFILM Wako Pure Chemical Corporation, Chiba Fatty Acid Co., Ltd., etc.

The amount of the stearic acid, if present, per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the effects of the present invention tend to be well achieved.

The rubber composition of the present invention preferably contains zinc oxide.

Conventional zinc oxide may be used. Examples include commercial products of Mitsui Mining & Smelting Co., Ltd., Toho Zinc Co., Ltd., HakusuiTech Co., Ltd., Seido Chemical Industry Co., Ltd., Sakai Chemical Industry Co., Ltd., etc.

The amount of the zinc oxide, if present, per 100 parts by mass of the rubber component is preferably 0.5 parts by mass or more, more preferably 1 part by mass or more, but is preferably 10 parts by mass or less, more preferably 5 parts by mass or less. When the amount is within the range indicated above, the effects of the present invention tend to be better achieved.

The rubber composition of the present invention preferably contains sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone, or two or more of these may be used in combination.

The sulfur may be a commercial product of, for example, Tsurumi Chemical Industry Co., Ltd., Karuizawa Sulfur Co., Ltd., Shikoku Chemicals Corporation, Flexsys, Nippon Kanryu Industry Co., Ltd., or Hosoi Chemical Industry Co., Ltd.

The amount of the sulfur, if present, per 100 parts by mass of the rubber component is preferably 0.5 parts by mass or more, more preferably 0.8 parts by mass or more, but is preferably 10 parts by mass or less, more preferably 5 parts by mass or less, still more preferably 3 parts by mass or less. When the amount is within the range indicated above, the effects of the present invention tend to be well achieved.

The rubber composition of the present invention preferably contains a vulcanization accelerator.

Examples of the vulcanization accelerator include thiazole vulcanization accelerators such as 2-mercaptobenzothiazole, di-2-benzothiazolyl disulfide, and N-cyclohexyl-2-benzothiazylsulfenamide; thiuram vulcanization accelerators such as tetramethylthiuram disulfide (TMTD), tetrabenzylthiuram disulfide (TBzTD), and tetrakis(2-ethylhexyl) thiuram disulfide (TOT-N); sulfenamide vulcanization accelerators such as N-cyclohexyl-2-benzothiazole sulfenamide, N-t-butyl-2-benzothiazolylsulfenamide, N-oxyethylene-2-benzothiazole sulfenamide, N-oxyethylene-2-benzothiazole sulfonamide, and N,N'-diisopropyl-2-benzothiazole sulfenamide; and guanidine vulcanization accelerators such as diphenylguanidine, diorthotolylguanidine, and orthotolylbiguanidine. These may be used alone, or two or more of these may be used in combination. Among these, sulfenamide and/or guanidine vulcanization accelerators are preferred in order to more suitably achieve the effects of the present invention.

The amount of the vulcanization accelerator, if present, per 100 parts by mass of the rubber component is preferably 1 part by mass or more, more preferably 3 parts by mass or more, but is preferably 10 parts by mass or less, more preferably 7 parts by mass or less. When the amount is within the range indicated above, the effects of the present invention tend to be well achieved.

The rubber composition may contain additives commonly used in the tire industry, in addition to the above-mentioned components. Examples of the additives include processing aids such as plasticizers and lubricants; softeners other than oils; and vulcanizing agents other than sulfur (e.g., organic crosslinking agents, organic peroxides).

The rubber composition of the present invention may be prepared by common methods. Specifically, it may be prepared by kneading the components using a kneading machine such as a Banbury mixer, a kneader, or an open roll mill, and vulcanizing the kneaded mixture. Since the tetrazine compound used in the present invention is expected to interact with a reinforcing filler (particularly carbon black or silica) and also to contribute to the dispersibility of the reinforcing filler, the tetrazine compound is preferably kneaded with the rubber component so that the tetrazine compound is dispersed in the rubber component before or simultaneously with mixing the reinforcing filler (particularly carbon black or silica).

The kneading conditions are as follows. When additives other than vulcanizing agents and vulcanization accelerators are compounded, the kneading temperature is usually 50 to 200° C., preferably 80 to 190° C., and the kneading time is usually 30 seconds to 30 minutes, preferably 1 to 30 minutes.

When vulcanizing agents and vulcanization accelerators are compounded, the kneading temperature is usually 100° C. or lower, preferably from room temperature to 80° C. Then, the composition containing a vulcanizing agent(s) and/or vulcanization accelerator(s) is usually vulcanized by press vulcanization, for example. The vulcanization temperature is usually 120 to 200° C., preferably 140 to 180° C.

The rubber composition of the present invention is suitable for use in treads (cap treads) but may also be used in tire components other than treads, such as sidewalls, base treads, undertreads, clinch apexes, bead apexes, breaker cushion rubbers, carcass cord topping rubbers, insulations, chafers, or innerliners, or in side reinforcing layers of run-flat tires.

The pneumatic tire of the present invention can be produced using the rubber composition by usual methods.

Specifically, the unvulcanized rubber composition containing the components may be extruded into the shape of a tire component such as a tread and assembled with other tire components on a tire building machine in a usual manner to build an unvulcanized tire, which may then be heated and pressurized in a vulcanizer to produce a tire.

The pneumatic tire of the present invention may be suitably used as a tire for passenger vehicles, large passenger vehicles, large SUVs, heavy load vehicles such as trucks and buses, light trucks, or two-wheeled vehicles, or as a run-flat tire or a winter tire.

EXAMPLES

The present invention is specifically described with reference to examples, but the present invention is not limited to the examples.

The chemicals used in the examples and comparative examples are listed below.

SBR: Tufdene 3830 (S-SBR, bound styrene content: 33% by mass, vinyl content: 34% by mass, oil content: 37.5 parts by mass per 100 parts by mass of rubber solids, unmodified) available from Asahi Kasei Corporation BR: BR1220 (BR, cis content: 97% by mass) available from Zeon Corporation Butyl rubber: Butyl 268 available from Japan Butyl Co., Ltd.

Carbon black: SHOBLACK N220 (N220, $N_2SA$: 111 $m^2/g$) available from Cabot Japan K.K.

Silica: Ultrasil VN3 ($N_2SA$: 175 $m^2/g$) available from Degussa

Silane coupling agent: NXT (3-octanoylthio-1-propyltriethoxysilane) available from Momentive Oil: Diana Process P523 available from Idemitsu Kosan Co; Ltd.

Wax: Ozoace 0355 available from Nippon Seiro Co., Ltd.

Antioxidant 1: OZONONE 6C (N-(1,3-dimethylbutyl)-N'-phenyl-p-phenylenediamine) available from Seiko Chemical Co., Ltd.

Antioxidant 2: NOCRAC RD (poly(2,2,4-trimethyl-1,2-dihydroquinoline)) available from Ouchi Shinko Chemical Industrial Co., Ltd.

Stearic acid: stearic acid "TSUBAKI" available from NOF Corporation

Zinc oxide: Zinc oxide #1 available from Mitsui Mining & Smelting Co., Ltd.

Sulfur: powdered sulfur available from Tsurumi Chemical Industry Co., Ltd.

Vulcanization accelerator 1: NOCCELER NS (N-tert-butyl-2-benzothiazolylsulfenamide) available from Ouchi Shinko Chemical Industrial Co., Ltd.

Vulcanization accelerator 2: NOCCELER D (diphenylguanidine) available from Ouchi Shinko Chemical Industrial Co., Ltd.

Tetrazine compound A: a compound of formula (1-1-1)
Tetrazine compound B: a compound of formula (1-2-1)
Tetrazine compound C: a compound of formula (1-3-1)
Tetrazine compound D: a compound of formula (1-4-1)

Aromatic-modified hydrogenated terpene resin (a hydrocarbon resin prepared in Synthesis Example below)

Aromatic-modified terpene resin: YS resin TO125 (a production lot with a softening point of 127° C.; the number of hydrogen atoms with chemical shifts in the range of at least 4 ppm but not more than 6 ppm is 1% of the total number of hydrogen atoms; hydroxyl value (OH value): 0 mgKOH/g) available from Yasuhara Chemical Co., Ltd.

Styrene resin: a copolymer of α-methylstyrene and styrene (softening point: 85° C., Mw: 700, SP value: 9.1, the number of hydrogen atoms with chemical shifts in the range of at least 4 ppm but not more than 6 ppm is 1% of the total number of hydrogen atoms)

Polyterpene resin: Sylvatraxx 4150 (softening point: 70 to 80° C., the number of hydrogen atoms with chemical shifts in the range of at least 4 ppm but not more than 6 ppm is 3% of the total number of hydrogen atoms) available from Arizona Chemical Synthesis Example To a sufficiently nitrogen-purged autoclave equipped with a stirring blade were charged cyclohexane, tetrahydrofuran (THF), a starting resin (a production lot of TO125 [YS resin TO125 available from Yasuhara Chemical Co., Ltd.] with a measured softening point of 127° C.), and 10% palladium carbon. The contents were purged with nitrogen and subsequently with hydrogen to a pressure of 5.0 kg/cm$^2$, followed by catalytic hydrogenation at 80° C. to give an aromatic-modified hydrogenated terpene resin. The yield was almost 100%.

The aromatic-modified hydrogenated terpene resin was added to carbon tetrachloride as a solvent to a concentration of 15% by mass to give a mixture. H$^1$-NMR analysis at 100 MHz of the mixture showed that the number of hydrogen atoms with chemical shifts in the range of at least 4 ppm but not more than 6 ppm was 0.3% of the total number of hydrogen atom. Moreover, the resin had a hydroxyl value (OH value) of 0 mgKOH/g, a softening point of 126° C., and a SP value of 8.70.

Examples and Comparative Examples

The materials in the amounts shown in Table 1 or 2 were kneaded to give an unvulcanized rubber composition. The unvulcanized rubber composition was formed into a tread shape and then assembled with other tire components to build an unvulcanized tire. The unvulcanized tire was pressurized and heated to prepare a test tire (size: 195/65R15). The test tires prepared as above were evaluated as described below. Tables 1 and 2 show the results. It should be noted that Comparative Example 3 and Example 12 are used as standards of comparison in Tables 1 and 2, respectively. Moreover, a value of [(abrasion resistance index)+(wet grip performance index)]/2 was calculated and used as an indicator of the balance between abrasion resistance and wet grip performance. A higher value indicates a better balance between abrasion resistance and wet grip performance.

(Abrasion resistance)

Each set of test tires was mounted on a front-engine, front-wheel-drive car made in Japan. After running 8000 km, the groove depth in the tire tread portion was measured. A distance that caused a 1 mm decrease in tire groove depth was calculated and expressed as an index (abrasion resistance index), with the standard example set equal to 100. A higher index means that a longer distance is required to cause a 1 mm decrease in tire groove depth, indicating better abrasion resistance.

(Wet Grip Performance)

The test tire of each example was mounted on each wheel of a car (front-engine, front-wheel-drive car of 2000 cc displacement made in Japan). The braking distance of the car with an initial speed of 100 km/h under wet asphalt conditions was determined and expressed as an index (wet grip performance index), with the standard example set equal to 100. A higher index indicates a shorter braking distance and better wet grip performance.

(Fuel Economy)

The rolling resistance of the test tires mounted on a rim (15×6JJ) and run at an internal pressure of 230 kPa, a load of 3.43 kN, and a speed of 80 km/h was measured using a rolling resistance tester and expressed as an index (fuel economy index), with the standard example set equal to 100. A higher index indicates better fuel economy.

TABLE 1

| | | Example 1 | Example 2 | Example 3 | Example 4 | Comparative Example 1 | Comparative Example 2 | Comparative Example 3 |
|---|---|---|---|---|---|---|---|---|
| Amount (parts by mass) | SBR | 110 | 110 | 110 | 110 | 69 | 110 | 69 |
| | BR | 20 | 20 | 20 | 20 | 20 | 20 | 20 |
| | Butyl rubber | 0 | 0 | 0 | 0 | 30 | 0 | 30 |
| | Carbon black | 10 | 10 | 10 | 10 | 10 | 10 | 10 |
| | Silica | 85 | 85 | 85 | 85 | 85 | 85 | 85 |
| | Silane coupling agent | 7 | 7 | 7 | 7 | 7 | 7 | 7 |
| | Oil | 15 | 15 | 15 | 15 | 15 | 15 | 15 |
| | Wax | 2 | 2 | 2 | 2 | 2 | 2 | 2 |
| | Antioxidant 1 | 3 | 3 | 3 | 3 | 3 | 3 | 3 |
| | Antioxidant 2 | 3 | 3 | 3 | 3 | 3 | 3 | 3 |
| | Stearic acid | 3 | 3 | 3 | 3 | 3 | 3 | 3 |
| | Zinc oxide | 2 | 2 | 2 | 2 | 2 | 2 | 2 |
| | Sulfur | 2 | 2 | 2 | 2 | 2 | 2 | 2 |
| | Vulcanization accelerator 1 | 2 | 2 | 2 | 2 | 2 | 2 | 2 |
| | Vulcanization accelerator 2 | 2 | 2 | 2 | 2 | 2 | 2 | 2 |
| | Tetrazine compound A | 2.0 | 0 | 0 | 0 | 2.0 | 0 | 0 |
| | Tetrazine compound B | 0 | 2.0 | 0 | 0 | 0 | 0 | 0 |
| | Tetrazine compound C | 0 | 0 | 2.0 | 0 | 0 | 0 | 0 |
| | Tetrazine compound D | 0 | 0 | 0 | 2.0 | 0 | 0 | 0 |

TABLE 1-continued

|  |  | Example 1 | Example 2 | Example 3 | Example 4 | Comparative Example 1 | Comparative Example 2 | Comparative Example 3 |
|---|---|---|---|---|---|---|---|---|
| Evaluation | Abrasion resistance | 150 | 140 | 135 | 140 | 110 | 120 | 100 |
|  | Wet grip performance | 110 | 105 | 101 | 102 | 105 | 85 | 100 |
|  | (Abrasion resistance + Grip)/2 | 130 | 122.5 | 118 | 121 | 107.5 | 102.5 | 100 |
|  | Fuel economy | 130 | 120 | 115 | 118 | 110 | 110 | 100 |

TABLE 2

|  |  | Example 5 | Example 6 | Example 7 | Example 8 | Example 9 | Example 10 |
|---|---|---|---|---|---|---|---|
| Amount (parts by mass) | SBR | 110 | 110 | 110 | 110 | 110 | 110 |
|  | BR | 20 | 20 | 20 | 20 | 20 | 20 |
|  | Butyl rubber | 0 | 0 | 0 | 0 | 0 | 0 |
|  | Carbon black | 10 | 10 | 10 | 10 | 10 | 10 |
|  | Silica | 85 | 85 | 85 | 85 | 85 | 85 |
|  | Silane coupling agent | 7 | 7 | 7 | 7 | 7 | 7 |
|  | Aromatic-modified hydrogenated terpene resin | 20 | 40 | 50 | 40 | 40 | 40 |
|  | Aromatic-modified terpene resin | 0 | 0 | 0 | 0 | 0 | 0 |
|  | Styrene resin | 0 | 0 | 0 | 0 | 0 | 0 |
|  | Polyterpene resin | 0 | 0 | 0 | 0 | 0 | 0 |
|  | Oil | 15 | 15 | 15 | 15 | 15 | 15 |
|  | Wax | 2 | 2 | 2 | 2 | 2 | 2 |
|  | Antioxidant 1 | 3 | 3 | 3 | 3 | 3 | 3 |
|  | Antioxidant 2 | 3 | 3 | 3 | 3 | 3 | 3 |
|  | Stearic acid | 3 | 3 | 3 | 3 | 3 | 3 |
|  | Zinc oxide | 2 | 2 | 2 | 2 | 2 | 2 |
|  | Sulfur | 2 | 2 | 2 | 2 | 2 | 2 |
|  | Vulcanization accelerator 1 | 2 | 2 | 2 | 2 | 2 | 2 |
|  | Vulcanization accelerator 2 | 2 | 2 | 2 | 2 | 2 | 2 |
|  | Tetrazine compound A | 2.0 | 2.0 | 0.7 | 0 | 0 | 0 |
|  | Tetrazine compound B | 0 | 0 | 0 | 2.0 | 0 | 0 |
|  | Tetrazine compound C | 0 | 0 | 0 | 0 | 2.0 | 0 |
|  | Tetrazine compound D | 0 | 0 | 0 | 0 | 0 | 2.0 |
|  | Y/X | 10 | 20 | 71 | 20 | 20 | 20 |
| Evaluation | Abrasion resistance | 99 | 95 | 90 | 94 | 92 | 95 |
|  | Wet grip performance | 105 | 115 | 120 | 113 | 111 | 116 |
|  | Fuel economy | 100 | 97 | 93 | 95 | 93 | 95 |
|  | Average of three property indexes | 101 | 102 | 101 | 101 | 99 | 102 |

|  |  | Example 11 | Example 12 | Example 13 | Example 14 | Example 15 |
|---|---|---|---|---|---|---|
| Amount (parts by mass) | SBR | 110 | 110 | 110 | 110 | 110 |
|  | BR | 20 | 20 | 20 | 20 | 20 |
|  | Butyl rubber | 0 | 0 | 0 | 0 | 0 |
|  | Carbon black | 10 | 10 | 10 | 10 | 10 |
|  | Silica | 85 | 85 | 85 | 85 | 85 |
|  | Silane coupling agent | 7 | 7 | 7 | 7 | 7 |
|  | Aromatic-modified hydrogenated terpene resin | 70 | 10 | 0 | 0 | 0 |
|  | Aromatic-modified terpene resin | 0 | 0 | 40 | 0 | 0 |
|  | Styrene resin | 0 | 0 | 0 | 40 | 0 |
|  | Polyterpene resin | 0 | 0 | 0 | 0 | 40 |
|  | Oil | 15 | 15 | 15 | 15 | 15 |
|  | Wax | 2 | 2 | 2 | 2 | 2 |
|  | Antioxidant 1 | 3 | 3 | 3 | 3 | 3 |
|  | Antioxidant 2 | 3 | 3 | 3 | 3 | 3 |
|  | Stearic acid | 3 | 3 | 3 | 3 | 3 |
|  | Zinc oxide | 2 | 2 | 2 | 2 | 2 |
|  | Sulfur | 2 | 2 | 2 | 2 | 2 |
|  | Vulcanization accelerator 1 | 2 | 2 | 2 | 2 | 2 |
|  | Vulcanization accelerator 2 | 2 | 2 | 2 | 2 | 2 |
|  | Tetrazine compound A | 0.6 | 2.0 | 2.0 | 2.0 | 2.0 |
|  | Tetrazine compound B | 0 | 0 | 0 | 0 | 0 |
|  | Tetrazine compound C | 0 | 0 | 0 | 0 | 0 |
|  | Tetrazine compound D | 0 | 0 | 0 | 0 | 0 |
|  | Y/X | 116 | 5 | 20 | 20 | 20 |
| Evaluation | Abrasion resistance | 65 | 100 | 94 | 95 | 95 |
|  | Wet grip performance | 125 | 100 | 113 | 115 | 117 |
|  | Fuel economy | 80 | 100 | 95 | 97 | 98 |
|  | Average of three property indexes | 90 | 100 | 101 | 102 | 103 |

As shown in Tables 1 and 2, abrasion resistance was improved in the examples which contained a rubber component including at least 80% by mass in total of at least one of an isoprene-based rubber, a polybutadiene rubber, or a styrene-butadiene rubber and contained, per 100 parts by mass of the rubber component, 3 to 250 parts by mass of a reinforcing filler and 0.2 to 10 parts by mass of a tetrazine compound of formula (1). Moreover, the examples also exhibited improved fuel economy and wet grip performance, as well as an improved balance between abrasion resistance and wet grip performance.

Furthermore, comparison of Comparative Examples 1 to 3 with Example 1 revealed that the combination of the diene rubbers and the tetrazine compound synergistically improved not only abrasion resistance but also fuel economy and wet grip performance, and, further, synergistically improved the balance between abrasion resistance and wet grip performance.

The invention claimed is:

1. A rubber composition for tires, comprising a rubber component and a hydrocarbon resin,
   the rubber component comprising at least 80% by mass in total of at least one of an isoprene-based rubber, a polybutadiene rubber, or a styrene-butadiene rubber,
   the rubber composition further comprising, per 100 parts by mass of the rubber component, 3 to 250 parts by mass of a reinforcing filler comprising silica and 0.2 to 10 parts by mass of a tetrazine compound represented by the following formula (1):

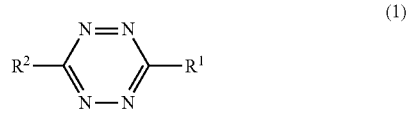

(1)

wherein $R^1$ and $R^2$ may be the same or different and each represent a hydrogen atom, —COOR$^3$ in which R$^3$ represents either a hydrogen atom or an alkyl group, or a C1-C11 monovalent hydrocarbon group optionally containing a heteroatom, and $R^1$ and $R^2$ may each form a salt, and
   the rubber composition satisfying the equation: Y/X=10 to 30 wherein X and Y denote amounts of the tetrazine compound and the hydrocarbon resin, respectively, per 100 parts by mass of the rubber component,
   wherein
   the amount of the hydrocarbon resin is 40 parts by mass or more per 100 parts by mass of the rubber component, and
   the amount of silica is 85 parts by mass or more per 100 parts by mass of the rubber component.

2. The rubber composition for tires according to claim 1, wherein the tetrazine compound is a compound represented by formula (1-1), (1-2), (1-3), or (1-4):

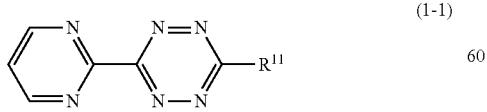

(1-1)

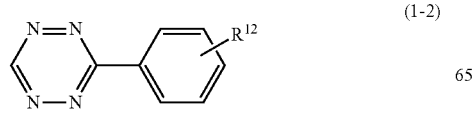

(1-2)

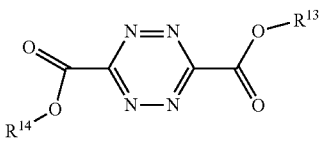

(1-3)

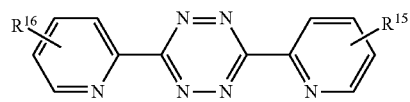

(1-4)

wherein
   in formula (1-1), $R^{11}$ represents a hydrogen atom, —COOR$^{17}$ in which R$^{17}$ represents either a hydrogen atom or an alkyl group, or a C1-C11 monovalent hydrocarbon group optionally containing a heteroatom, and $R^{11}$ may form a salt;
   in formula (1-2), $R^{12}$ represents a functional group containing at least one atom selected from the group consisting of nitrogen, oxygen, sulfur, fluorine, and silicon atoms, and $R^{12}$ may form a salt;
   in formula (1-3), $R^{13}$ and $R^{14}$ may be the same or different and each represent a hydrogen atom or an alkyl group, and $R^{13}$ and $R^{14}$ may each form a salt; and
   in formula (1-4), $R^{15}$ and $R^{16}$ may be the same or different and each represent a hydrogen atom, —COOR$^{18}$ in which R$^{18}$ represents either a hydrogen atom or an alkyl group, or a functional group containing at least one atom selected from the group consisting of nitrogen, oxygen, sulfur, fluorine, and silicon atoms, and $R^{15}$ and $R^{16}$ may each form a salt.

3. The rubber composition for tires according to claim 1, wherein the tetrazine compound is a compound represented by formula (1-1-1), (1-1-2), (1-2-1), (1-3-1), (1-4-1), or (1-4-2):

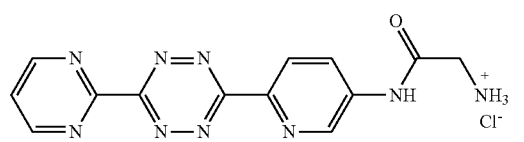

(1-1-1)

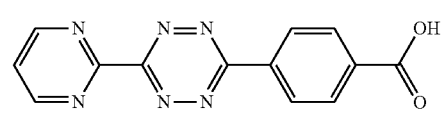

(1-1-2)

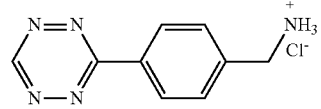

(1-2-1)

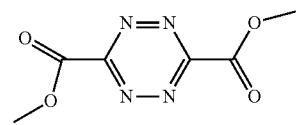

(1-3-1)

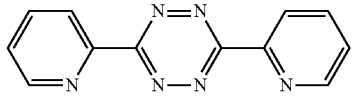

(1-4-1)

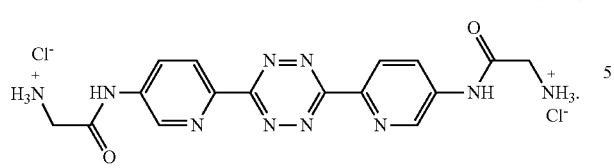

(1-4-2)

4. The rubber composition for tires according to claim 1, wherein the resin has a number of hydrogen atoms with $H^1$-NMR chemical shifts in the range of at least 4 ppm but not more than 6 ppm of 5% or less of the total number of hydrogen atoms.

5. The rubber composition for tires according to claim 1, wherein the rubber composition comprises, per 100 parts by mass of the rubber component, 3 to 50 parts by mass of carbon black.

6. A pneumatic tire, comprising a tread comprising the rubber composition according to claim 1.

7. The rubber composition for tires according to claim 1, wherein
the amount of the hydrocarbon resin is 40 to 80 parts by mass per 100 parts by mass of the rubber component, and
the amount of silica is 85 to 200 parts by mass per 100 parts by mass of the rubber component.

8. The rubber composition for tires according to claim 1, wherein
the amount of the hydrocarbon resin is 40 to 50 parts by mass per 100 parts by mass of the rubber component, and
the amount of silica is 85 to 100 parts by mass per 100 parts by mass of the rubber component.

9. A tire for heavy load vehicles, comprising a rubber composition for tires, comprising a rubber component and a hydrocarbon resin,
the rubber component comprising at least 80% by mass in total of at least one of an isoprene-based rubber, a polybutadiene rubber, or a styrene-butadiene rubber and at least 20% by mass of a polybutadiene rubber,
the rubber composition further comprising, per 100 parts by mass of the rubber component, 250 parts by mass or less of a reinforcing filler comprising carbon black and silica and 0.2 to 10 parts by mass of a tetrazine compound represented by the following formula (1):

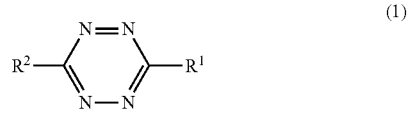

(1)

wherein $R^1$ and $R^2$ may be the same or different and each represent a hydrogen atom, —$COOR^3$ in which $R^3$ represents either a hydrogen atom or an alkyl group, or a C1-C11 monovalent hydrocarbon group optionally containing a heteroatom, and $R^1$ and $R^2$ may each form a salt,
the rubber composition satisfying the equation: $Y/X=10$ to 30 wherein X and Y denote amounts of the tetrazine compound and the hydrocarbon resin, respectively, per 100 parts by mass of the rubber component,
wherein
the amount of the hydrocarbon resin is 40 parts by mass or more per 100 parts by mass of the rubber component,
wherein the amount of carbon black is 5 to 30 parts by mass per 100 parts by mass of the rubber component, and
wherein the amount of silica is 30 to 85 parts by mass per 100 parts by mass of the rubber component.

10. The rubber composition for tires according to claim 1, wherein the hydrocarbon resin is a terpene resin.

11. The rubber composition for tires according to claim 9, wherein the hydrocarbon resin is a terpene resin.

* * * * *